(12) United States Patent
Bryant (10) Patent No.: US 6,349,808 B1
(45) Date of Patent: Feb. 26, 2002

(54) CORD REWINDER DEVICE AND HORIZONTALLY-MOUNTED ELECTRICAL CORD REWINDER DEVICE FOR A VACUUM CLEANER

(75) Inventor: Kevin L. Bryant, Terry, MS (US)

(73) Assignee: Multicraft International, Brandon, MS (US)

( * ) Notice: Subject to any disclaimer, the term of this patent is extended or adjusted under 35 U.S.C. 154(b) by 0 days.

(21) Appl. No.: 09/534,498

(22) Filed: Mar. 24, 2000

(51) Int. Cl.<sup>7</sup> ............................................. H02G 11/00
(52) U.S. Cl. ........................ 191/12.2 R; 191/12 R; 191/12.4; 191/12.2 A
(58) Field of Search ................. 191/12 R, 12.2 R, 191/12.4, 12.2 A (56) References Cited

U.S. PATENT DOCUMENTS

| | | | |
|---|---|---|---|
| 3,900,167 A | * 8/1975 | Hull | 242/84.2 |
| 3,929,210 A | * 12/1975 | Cutler et al. | 191/12.2 R |
| 4,141,438 A | * 2/1979 | Diem | 191/12.4 |
| 4,284,180 A | * 8/1981 | Masters | 191/12.2 |
| 4,592,764 A | * 6/1986 | Ikezaki et al. | 55/276 |
| 4,713,497 A | * 12/1987 | Smith | 191/12.2 |
| 5,263,431 A | * 11/1993 | Wood | 114/254 |
| 5,590,749 A | * 1/1997 | Wagner et al. | 191/12.4 |
| 5,937,476 A | * 8/1999 | Kim | 15/323 |
| 6,052,862 A | * 4/2000 | Lowery | 15/323 |

* cited by examiner

Primary Examiner—S. Joseph Morano
Assistant Examiner—Frantz F. Jules
(74) Attorney, Agent, or Firm—Blank Rome Comisky & McCauley, LLP (57) ABSTRACT

A cord rewinder device stores and dispenses flexible cord and includes a base, a reel, a spring element and a brake mechanism. The reel is rotatably mounted to the base and is operative to rotate an axis of rotation in a first direction and second direction opposite the first direction. In the first direction, the flexible cord is wound about the reel for storage within the cord rewinder device. In the second direction, the flexible cord is dispensed from the cord rewinder device. The spring element is connected to and between the base and the reel and is operative to apply a winding force to the reel. The brake mechanism is mounted to the base and is operative to move to and between a reel engaged position and a reel disengaged position. In the reel engaged position, the brake mechanism contacts the reel preventing the rotation of the reel in the first direction while permitting rotation of the reel in the second direction. In the reel disengaged position, the brake mechanism is disengaged from contact with the reel to permit the reel to automatically rotate in the first direction as a result of the winding force. The cord rewinder device is especially useful when used in a horizontal orientation with a shop-type vacuum cleaner for rewinding the electrical cord for the vacuum cleaner.

44 Claims, 6 Drawing Sheets

CORD REWINDER DEVICE AND HORIZONTALLY-MOUNTED ELECTRICAL CORD REWINDER DEVICE FOR A VACUUM CLEANER

FIELD OF THE INVENTION

The invention relates to a cord rewinder device for storing and dispensing a flexible cord. The invention is also directed to a horizontally-mounted electrical cord rewinder device for a vacuum cleaner that stores and dispenses an electrical cord.

BACKGROUND OF THE INVENTION

Many different types of flexible cords such as electrical cords, coaxial cable, rope and flexible tubing are available in the marketplace. Often, long lengths of such flexible cords pose a problem for storage. Typically, these long lengths of flexible cords are wound in a coil fashion when not in use. Mechanical or electromechanical rewinder devices are often used for rewinding lengthy flexible cords for storage and such cords can be dispensed therefrom for usage. Electrical cords are often needed to provide power for portable electrical equipment. In such instances, the electrical cords are either wound manually about a cord winding structure affixed to the electrical equipment for storage, or in some cases, taken up for storage on an electrical cord rewinder device mounted on the electrical equipment.

Specifically, for shop-type vacuum cleaners, flexible electrical cords are usually stored manually by winding the electrical cord around stationary posts located on the top or exterior of the vacuum cleaner housing. Some vacuum cleaners, particularly residential cannister-type vacuum cleaners, have a vertically-oriented cord rewinder device integrally connected to the vacuum cleaner housing. Other vacuum cleaners, such as upright vacuum cleaners, provide either posts for manually storing the flexible electrical cord or no capability for storing the cord.

SUMMARY OF THE INVENTION

A cord rewinder device of the invention stores and dispenses a flexible cord. The cord rewinder device of the invention includes a base, reel, a spring element and a brake element. The reel is rotatably connected to the base and is operative to rotate about an axis of rotation in a first direction and in a second direction opposite the first direction. In the first direction, the flexible cord is wound about the reel for storage within the cord rewinder device. In the second direction, the flexible cord is dispensed from the cord rewinder device. The spring element is connected to and between the base and the reel and is operative to apply a winding force to the reel. The brake mechanism is connected to the base and is operative to move to and between a reel engaged position and a reel disengaged position. In the reel engaged position, the brake mechanism contacts the reel to prevent rotation of the wheel in the first direction while permitting rotation of the reel in the second direction. In the reel disengage position, the brake mechanism is disengaged from contact with the reel to permit the reel to automatically rotate in the first direction as a result of the winding force.

Another embodiment of a cord rewinder device stores and dispenses a flexible cord having a pair of electrical leads. The cord rewinder device includes the reel, the spring element and the brake mechanism above. The cord rewinder device of the invention also includes a housing and a cord connector plate. The housing has a base and a cover which are releasably connected to each other and form an interior space therein. The cover has a pair of electrical brush elements that extend therethrough to provide electrical communication exteriorly of the cord rewinder device and into the interior space. The cord connector plate is connected to the reel for rotation therewith and has an inner electrically-conductive ring and an outer electrically-conductive ring disposed concentrically about the axis of rotation. The inner and outer electrically-conductive rings are arranged in a manner to maintain contact with the respective electrical brush elements when the base and the cover are releasably connected together and the reel rotates. Each ring has an electrically-conductive terminal member that extends radially outwardly therefrom for connection with the respective leads of the electrical cord.

Another embodiment of the invention is a cord rewinder device for storing and dispensing an electrical cord of a shop-type vacuum cleaner. The vacuum cleaner has a body defining an interior space and has a mounting structure in the interior space for mounting the cord rewinder. An electrical motor is also mounted in the body and is connected to the cord rewinder by an electrical cable with a pair of electrical cable leads. The retractable electrical cord of the rewinder also has a pair of electrical leads at the end thereof which are connected to a slip ring arrangement disposed in the cord rewinder. The cord rewinder device includes the housing having the base and the cover, the reel, the spring element, the cord connector plate and the brake mechanism. A pair of electrical brush elements connected to respective electrical cable leads from the electrical motor extend through the cover of the rewinder into the interior thereof and electrically engage the slip rings. The base of the cord rewinder has a plurality of fasteners spaced circumferentially apart from one another to mate with and engage respective mounting slots in the vacuum cleaner body. The plurality of fasteners are operative to secure the housing within the interior space of the vacuum cleaner in a horizontal orientation, that is, with the rotational axis of the rewinder oriented vertically.

The features of the invention will become apparent from the following description of the exemplary embodiments taken in conjunction with the accompanying drawings.

DETAILED DESCRIPTION OF THE EXEMPLARY EMBODIMENTS

A cord rewinder device 10 of the invention is illustrated in FIGS. 1–11. The cord rewinder device 10 of the invention is hereinafter described by way of example only for storing and dispensing an electrical cord 12 of a barrel-shaped shop vacuum cleaner 14. However, one of ordinary skill in the art would appreciate that the electrical cord 12 represents any flexible cord such as rope, string, flexible tubing, flexible hose, coaxial cable and the like. Thus, although the cord rewinder device 10 of the invention is particularly useful for a shop vacuum cleaner 14, the cord rewinder device 10 of the invention can be used with other types of vacuum cleaners or alone, i.e., without a vacuum cleaner, for storing and dispensing other kinds of flexible cords.

Figures 1, 2:
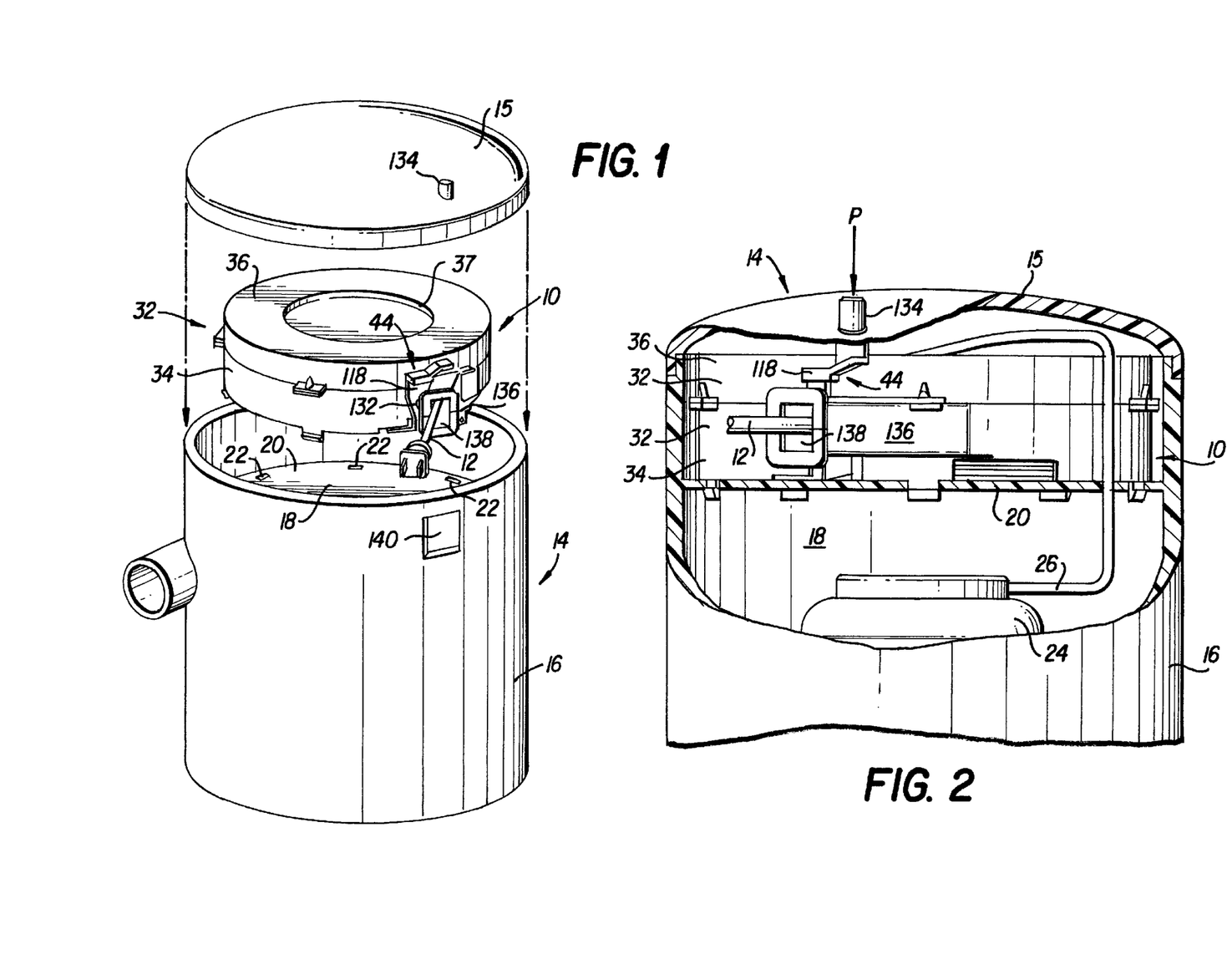
FIG. 1 is an exploded perspective view of a cord rewinder device of the invention oriented horizontally with respect to a barrel-shaped, shop-type vacuum cleaner.
FIG. 2 is a perspective view partially broken away with the cord rewinder device of the invention mounted horizontally within the shop-type vacuum cleaner shown in FIG. 1.

With reference to FIGS. 1 and 2, the vacuum cleaner 14 has a body 16 that defines an interior space 18 and is barrel-shaped. Such barrel-shaped vacuum cleaners are typically used in the so-called shop vacuum cleaners. The vacuum cleaner 14 also includes a mounting structure 20 in a form of a panel that is disposed within interior space 18 in a horizontal orientation as viewed when the vacuum cleaner 14 is used in its normal upright operating position. As used herein "horizontal mounting" and "horizontal orientation" of the cord rewinder refers to the fact that the cord rewinder is mounted on the vacuum cleaner such that the cord is dispensed and rewound in a horizontal plane with the rotational axis of the rewinder oriented vertically with respect to the surface supporting the vacuum cleaner. The mounting structure 20 contains a plurality of mounting slots 22 which are spaced circumferentially about the mounting structure 20. In addition, the vacuum cleaner 14 has an electrical motor 24 which is also disposed within the interior space 18. The electrical motor 24 has an electrical cable 26 that extends from the cord rewinder device 10 to the electrical motor 24 to provide electrical power to the motor.

Figure 3:
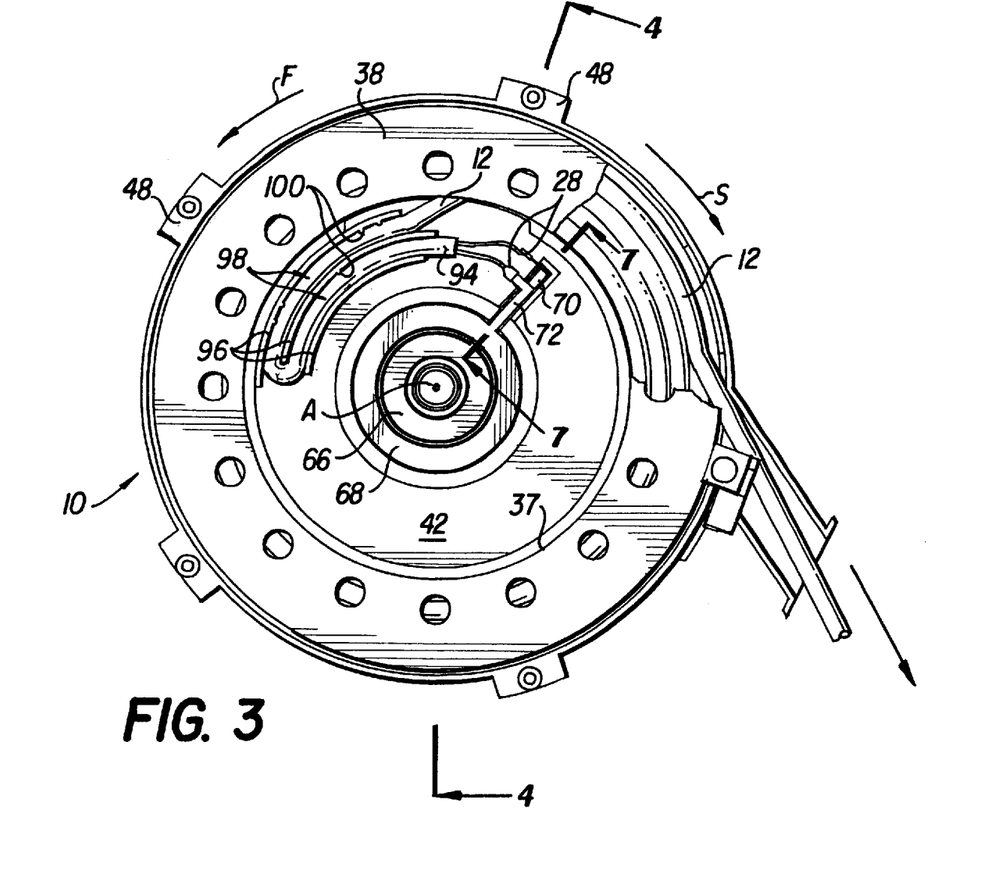
FIG. 3 is a top plan view of the cord rewinder device of the invention with its cover removed.
Figure 4:
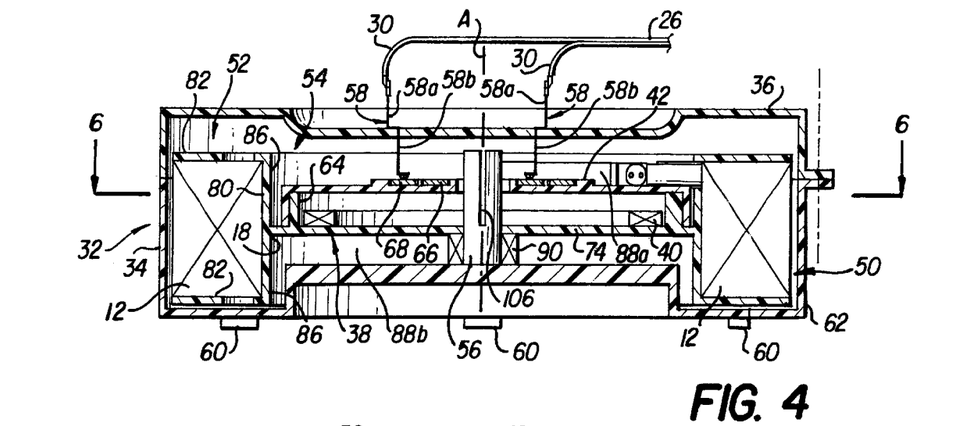
FIG. 4 is a side elevational view in cross-section of the cord rewinder device of the invention taken along line 4—4 of FIG. 3.

In FIG. 3, the electrical cord 12 includes a pair of electrical leads 28 for supplying electrical power from a source such as a 110-volt household or shop electrical outlet. In FIG. 4, the electrical cable 26 includes a pair of electrical cable leads 30 which supply electrical power to the vacuum cleaner motor 24. The electrical connection between the electrical leads 28 and the electrical cable leads 30 is discussed in more detail below.

Figure 5:
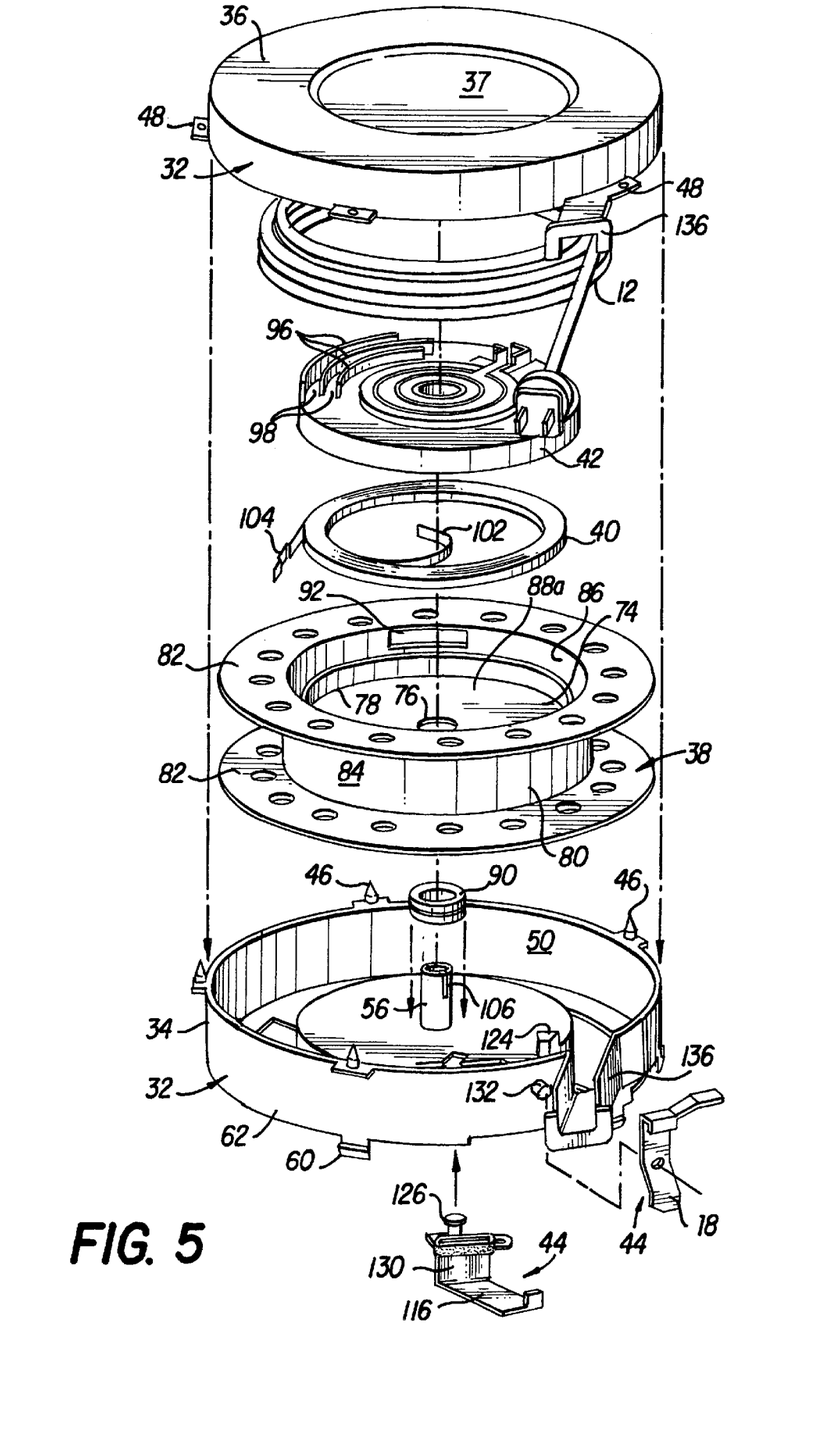
FIG. 5 is an exploded perspective view of the cord rewinder device of the invention.

With reference to FIGS. 1, 2 and 5, the cord rewinder device 10 of the invention includes a generally cylindrically-shaped housing 32 comprising a base 34 and a cover 36 with an opening 37. Mounted inside the housing 32 are a reel 38, a rewinder spring element 40, a cord connector plate 42 and the cord 12. A brake mechanism 44 is mounted on the exterior of the housing 32.

In FIGS. 1 and 5, the base 34 and the cover 36 of the housing 32 are releasably connected to each other by a plurality of pins 46 releasably engageable in the openings of latches 48 which are spaced from one another circumferentially about a periphery of the housing 32. The base 34 forms a base interior 50 and, the cover 36 forms a cover interior 52 as shown in FIG. 4. When releasably connected together, the base interior 50 and the cover interior 52 form a housing interior 54. The base 34 has a stubshaft 56 that is disposed coincident with an axis of rotation A in the base interior 50 and within the housing 54. The stubshaft 56 projects axially from the base 34.

The base 34 has a plurality of fasteners 60 depending from an outer periphery 62 of the base 34 and spaced circumferentially about the base 34 to align with and releasably engage respective ones of the mounting slots 22. The fasteners 60 are integrally formed with the base 34 in a form of flexible latching tabs. However, one of ordinary skill in the art will appreciate that other types of fasteners 60 could be used as long as the plurality of fasteners 60 are operative to secure the housing 32 within the interior space 18 in a horizontal orientation when the vacuum cleaner 14 is in its normal upright operating position.

As best shown in FIG. 4, the reel 38 is rotatably mounted to the stubshaft 56 within the housing interior 54. In FIG. 3, the reel 38 is operative to rotate in a first direction F and in a second direction S which is opposite the first direction F. In the first direction F, the electrical cord 12 is wound about the reel 38 for storage within the cord rewinder device 10 of the invention. In the second direction S, the electrical cord 12 is dispensed from the cord rewinder device 10 of the invention.

Referring now to FIG. 5, the spring element 40 is connected to and between the base 34 and the reel 38 as described in more detail below. The spring element 40 is operative to store spring energy when the cord is dispensed or pulled from the reel to thereby rotate the reel in the second direction S. The stored energy in the spring 40 then permits the spring to apply a rewinding force to the reel 38 in the first direction F to rewind the cord onto the reel. The cord connector plate 42 is connected to the reel 38 for rotation therewith and covers the spring 40. Although not by way of limitation, the cord connector plate 42 is force-fitted onto and over an inner annular wall or rim 64 of the reel 38.

Referring to FIG. 4, the cover 36 has a pair of electrical brush elements 58 that extend through the opening 37 in the cover 36. Each one of the pair of electrical brush elements 58 has an exterior end 58a that is connected to a respective one of the electrical cable leads 30 of the electrical cable 26 to the electrical motor 24. Each one of the electrical brush elements 58 also includes an interior end 5 8b that projects into the housing interior 54 for electrically connecting the motor 24 to the electrical power source as described below.

Figure 7:
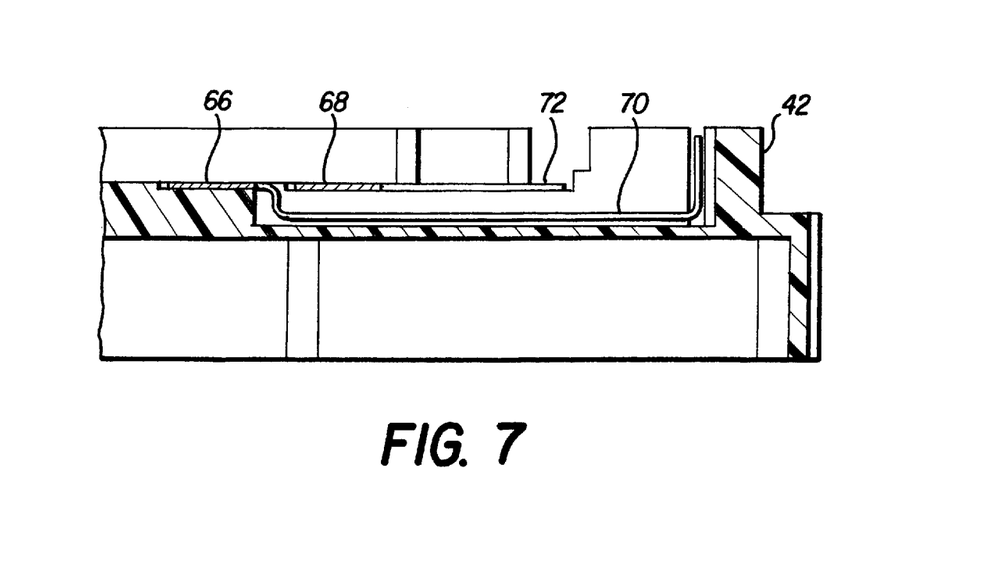
FIG. 7 is an enlarged partial side elevational view in cross-section of the cord rewinder device of the invention taken along line 7—7 in FIG. 3.

The cord connector plate 42 includes an inner electrically-conductive slip ring 66 and an outer electrically-conductive slip ring 68 as best shown in FIGS. 3 and 7. The inner slip ring 66 and the outer slip ring 68 are disposed concentrically about the axis of rotation A of the reel. In FIG. 4, the inner electrically-conductive slip ring 66 and the outer electrically-conductive slip ring 68 are arranged so as to maintain electrical contact with respective ones of the interior ends 58b of the electrical brush elements 58 when the base 34 and the cover 36 are releasably connected together and, particularly, when the reel 38 and cord connector plate 42 rotate relative to the housing 32. Each slip ring 66 and 68 has an electrically conductive terminal member 70 and 72, respectively, which extends radially outwardly for connection with a respective electrical lead 28 of the electrical cord 12. It is through the brush elements 58, the slips rings 66, 68 and terminal members 70, 72 that electrical power is continuously supplied from the cord 12 to the electrical cable 26 of the motor 24 regardless of the dispensed or rewound position of the cord.

As shown in FIG. 5, the reel 38 includes a central disk member 74 having an axial bore 76 disposed centrally therethrough. The central disk member 74 extends radially outwardly within the housing interior 54 and, specifically, within the base interior 50 as shown in FIG. 4. The central disk member 74 terminates at an outer periphery 78. The reel 38 is in the form of a bobbin with an annular wall 80 and a pair of side flanges 82 connected to opposite sides of the annular wall 80. Annular wall 80 extends axially to either side of the central disk member 74 and is connected circumferentially to the outer periphery 78 of the central disk member 74. The flanges 82 and annular wall 80 form an annular, cord-receiving channel 84, shown in FIG. 5. As best shown in FIG. 4, the annular wall 80 has an inner circumferential surface 86. The inner circumferential surface 86 of the annular wall 80 and the central disk member 74 define a pair of opposing cylindrical chambers 88a and 88a b on opposite sides of the reel 38. A bearing 90 (FIGS. 4 and 5), such as an axial low friction roller bearing, is disposed about the stubshaft and between the base 34 and the central disk member 74 of the reel 38 to rotatably support the reel 38 for low friction rotation with respect to the housing 32 and base 34. The bore 76 is larger in diameter than the diameter of the stubshaft 56 so that the reel 38 is free to rotate relative to the stubshaft 56.

Referring again to FIGS. 3 and 5, the annular wall 80 has a cord receiving opening 92 that extends through the wall 80 and is sized for receiving an end portion 94 (FIG. 3) of the electrical cord 12 from the annular, cord-receiving channel 84. The cord connector plate 42 includes a tension relief structure adapted to securely retain the end portion 94 of the electrical cord 12 within the cord rewinder device 10 so as to prevent the cord 12 from being detached from the device by reason of excess tensile forces being applied to the cord when it is pulled from the housing by a user of the vacuum cleaner 14.

With reference to FIGS. 3 and 5, the tension relief structure of the cord connector plate 42 includes three arcuate-shaped wall sections 96. The wall sections 96 are arranged in radially spaced relation to one another from the axis of rotation A in an approximate 90° arcuate sector of the cord connector plate 42. The wall sections 96 also project axially from cord connector plate 42 to form a pair of cord receiving channels 98. The end portion 94 of the electrical cord 12 is engaged within the pair of cord receiving channels 98 in a looped fashion and in a close-fitting, gripping relationship in the channels as best shown in FIG. 3. This arrangement assists in retaining the end portion 94 of the electrical cord 12 in a securely anchored position within the cord rewinder device 10. Also, a plurality of protuberances 100 extend radially within the pair of cord receiving channels 98. For better gripping, a plurality of protuberances 100 may be provided to further assist in retaining the end portion of the electrical cord 12 within the cord rewinder device 10. Thus, the electrical cord 12 is securely and fixedly anchored and cannot be pulled from the cord rewinder device 10 even when the user applies a strong tensile force to the cord when it is fully payed out from the reel 38.

Figures 6A, 6B:
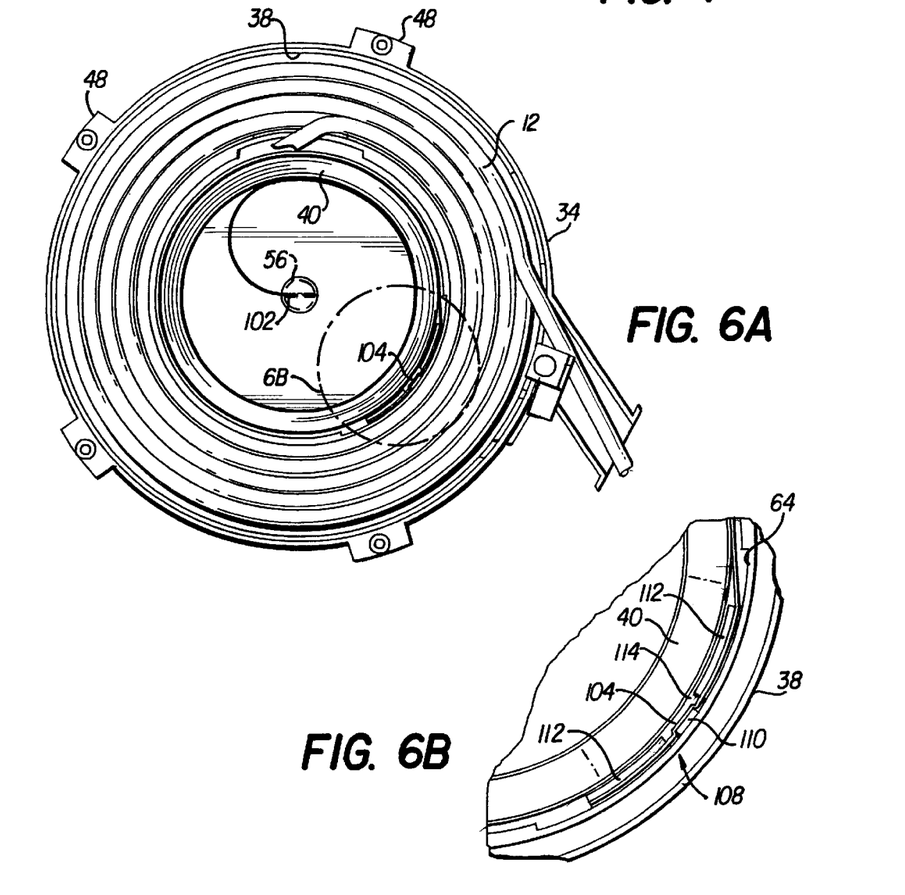
FIG. 6A is a top plan view of the cord rewinder device of the invention taken along line 6—6 in FIG. 4.
FIG. 6B is an enlarged detail of a portion of the cord rewinder device of the invention as indicated in FIG. 6A.

In FIG. 5, the spring element 40 is depicted as a spiral spring with a first end portion 102 and a second end portion 104. One of ordinary skill in the art would appreciate that other types of spring elements can be used to accomplish the purpose of the invention. Referring to FIGS. 6A and 6B, the first end portion 102 of the spring element 40 is connected to the stubshaft 56 and the second end portion 104 of the spring element 40 is connected to the inner surface of annular wall or rim 64 of the reel 38. The stubshaft 56 includes an axially extending slot 106 that is sized to receive and retain the first end portion 102 of the spring element 40. The reel 38 includes a fastener structure 108 as best shown in FIG. 6B. The fastener structure 108 includes a lug 110 that is connected to or formed on the inner surface of annular wall or rim 64. The inner surface of annular wall or rim 64 also is formed with a pair of slots 112 spaced on either side of the lug 110 to form a serpentine or tortuous channel 114. The second end portion 104 of the spring element 40 is configured to mate with the slots 112 and lug 110 and to be received by the serpentine channel 114, thus retaining the second end portion 104 in an anchored position on the reel 38. The spring element 40 is thus disposed in the space formed between the central disk member 74 and the cord connector plate 42 (FIGS. 4 and 5).

Figure 8:
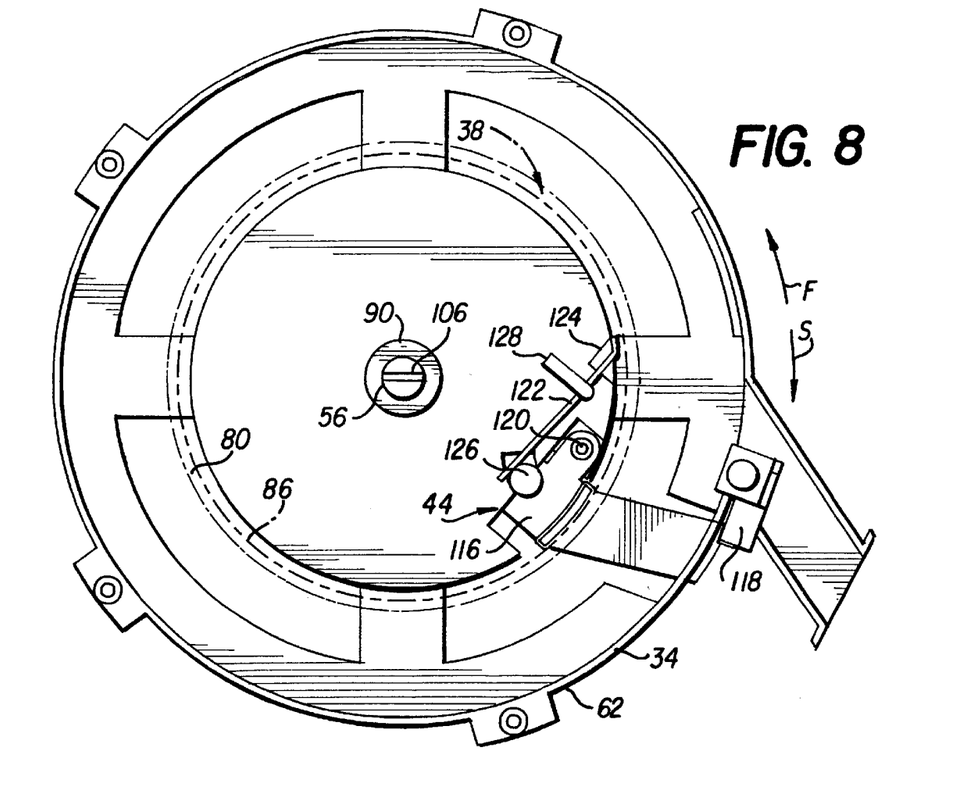
FIG. 8 is a top plan view of a base of the cord rewinder device of the invention illustrating a brake mechanism in a reel engaged position.
Figure 9:
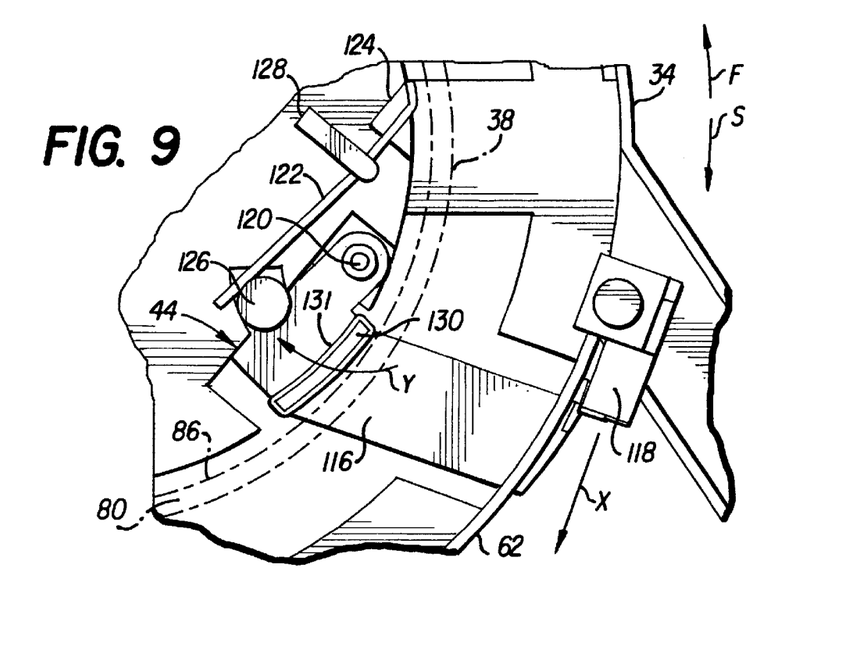
FIG. 9 is an enlarged partial top plan view of the brake mechanism in a reel disengaged position.
Figure 10:
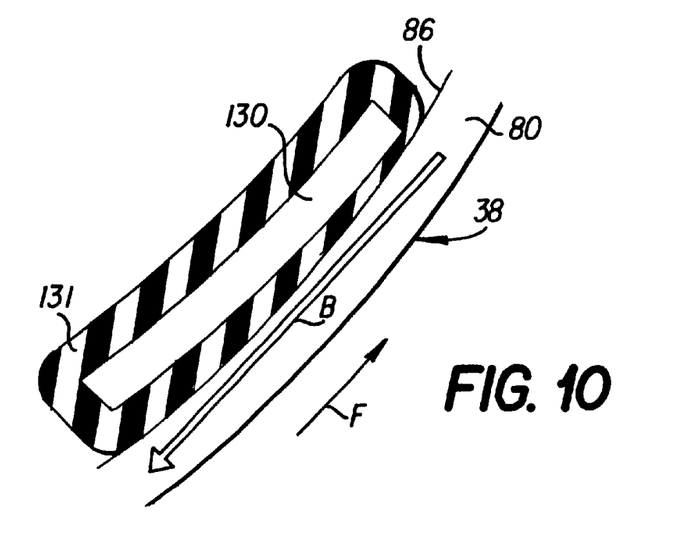
FIG. 10 is an enlarged partial top plan view of the brake mechanism in the reel engaged position preventing rotation of the reel in a first direction.
Figure 11:
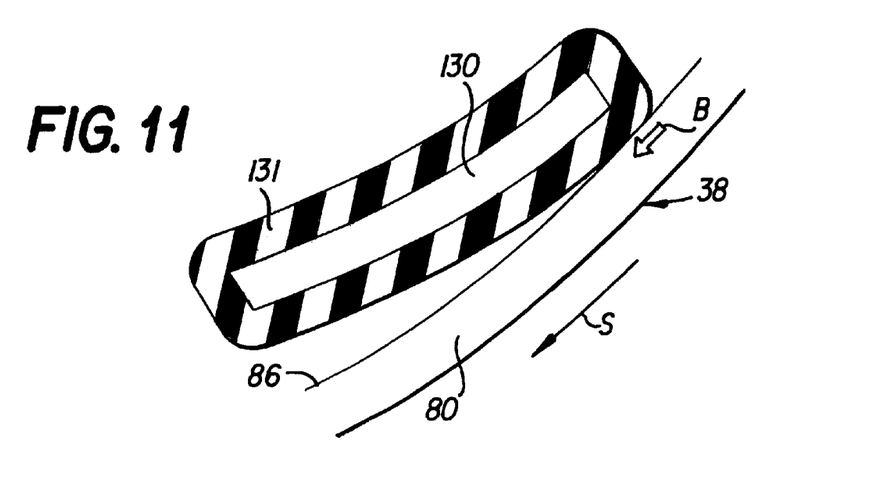
FIG. 11 is an enlarged partial top plan view of the brake mechanism in the reel engaged position permitting rotation in a second direction.

As shown generally in FIGS. 1, 2 and 5, the brake mechanism 44 is mounted to the exterior of base 34. The brake mechanism 44 is operative to move to and between a reel engaged position as shown in FIGS. 8, 10 and 11 and a reel disengaged position as shown in FIG. 9. In the reel engaged position (generally FIG. 8), the brake mechanism 44 contacts the reel 38 (shown in phantom for clarity) preventing rotation of the reel 38 in the first direction F (FIG. 10) while permitting rotation of the reel 38 in the second direction S (FIG. 11). In the reel disengaged position (FIG. 9), the brake mechanism 44 is disengaged from contact with the reel 38 (again shown in phantom) to permit the reel 38 to automatically rotate in the first direction F as a result of the stored rewinding spring force of the spring element 40.

As depicted in FIGS. 5, 8 and 9, the brake mechanism 44 of the invention includes a brake arm 116 and a brake release arm 118. The brake arm 116 is pivotably connected to the housing 32 by a pivot pin 120 and has an upstanding brake arm post 126. In particular, the brake arm 116 is pivotably connected inside the base 34 in the lower cylindrical chamber 88b and extends axially through an opening in the bottom of the base 34 and then radially outwardly beneath the base so as to project slightly radially beyond the outer base periphery 62. Further, the brake arm 116 contacts the inner circumferential surface 86 of the annular wall 80 of the reel 38 in the cylindrical chamber 88b in a resiliently biased manner. Specifically, a leaf spring 122 is fixed at one end in cantilever fashion to a leaf spring mounting post 124 on the base 34 beneath the central disk member 74 of the reel 38 and the other end resiliently engages a brake arm post 126 thereby urging the brake arm 116 counterclockwise about the pivot pin 120 toward the inner circumferential surface 86 of the annular wall 80. Although not by way of limitation, a fulcrum 128 may be disposed intermediate the ends of the leaf spring 122 to enhance the resiliency of the leaf spring 122 and increase the force applied to the brake arm post 126.

The brake arm 116 also includes an upstanding brake pad support 130 covered by a brake pad 131 that projects into the lower cylindrical chamber 88b. The brake pad 131 is preferably fabricated from a resilient material, such as rubber and is sized and adapted to contact the inner circumferential surface 86 of the annular wall 80 when the brake mechanism 44 is in the reel engaged position. In FIG. 10, when the brake mechanism 44 is in the reel engaged position and the reel 38 rotates in the first direction F, i.e., the cord retracting direction, the brake arm 116 pivots counterclockwise about pivot pin 120 so that the brake pad 131 tends to wedge itself against the inner circumferential surface 86 of the annular wall 80. Thus, a braking force B is applied to the reel 38 preventing its rotation. A greater tendency of the reel 38 to rotate in the first direction F, e.g., by reason of greater stored energy in the spring 40, causes a greater breaking force on the reel 38.

As seen in FIG. 11, when the brake mechanism 44 is in the reel engaged position and the reel 38 rotates in the second direction S, i.e., the cord dispensing or pay out direction, the brake arm 116 tends to pivot in the clockwise direction about pivot pin 120 and the brake pad 131 moves away from its wedging relationship with the inner circumferential surface 86 of the annular wall 80. Thus, the braking force B on the reel 38 is reduced so as to permit rotation of the reel 38 and pay out of the cord 12.

As best shown in FIGS. 1 and 5, the brake release arm 118 is pivotably connected to the exterior of base 34 of the housing 32 by pivot post 132. The brake release arm 118 engages the outermost end of brake arm 116 and, when rotated clockwise about pivot post 132, is operative to rotate the brake arm 116 clockwise about pivot pin 120 to disengage the brake arm 116 from contact with the inner circumferential surface 86 of the annular wall 80 and thereby move the brake mechanism 44 from the reel engaged position of FIGS. 8, 10 and 11 to the reel disengaged position of FIG. 9.

With reference to FIGS. 1 and 2, the cover 15 of the vacuum cleaner 14 is provided with a release pin or button 134 which is slidably mounted in the cover 15 in alignment with the brake release arm 118. By pressing the button 134 in the direction P (FIG. 2), the brake release arm 118 maybe rotated clockwise about pivot post 132 which causes the brake release arm 118 to move in the direction X (FIG. 9), which, in turn, causes the brake arm 116 to pivot clockwise in the direction Y (FIG. 9) to disengage the reel 38 and allow the spring 40 to rewind the cord 12 onto the reel 38.

As shown in FIGS. 1 and 2 the cord rewinder device 10 of the invention also includes a conduit 136 which is formed partly on the base 34 and partly on the cover 36 (FIG. 5). However, one of ordinary skill in the art will appreciate that the conduit 136 can be formed on the base 34 alone or the cover 36 alone. The conduit 136 forms a passage 138 into the housing 32 of the cord rewinder device of the invention for passage of the electrical cord 12 into and out of the cord rewinder device 10. An opening 140 is formed into the body 16 of the vacuum cleaner 14 through which the conduit 136 extends.

One of ordinary skill in the art would appreciate that the cord rewinder device of the invention can be used with many other types of electrical equipment having an electrical cord with electrical leads. Further, while the cord rewinder device of the invention is especially adapted for mounting in a horizontal orientation on a shop-type vacuum cleaner, a skilled artisan will appreciate that the cord rewinder device of the invention could be mounted in other orientations depending on the particular rewinding application.

Furthermore, one of ordinary skill in the art will appreciate that the cord rewinder device can be used for storing and dispensing many kinds of flexible cord such as flexible tubing, rope or string. As a result, it is not necessary to provide the cover 36 as described herein nor would it be necessary to provide the inner and outer electrically conductive rings and terminals. In other words, another embodiment of the cord rewinder device of the invention includes the base, the reel, the spring element and the brake mechanism.

Although the embodiments of the invention have been specifically described herein, it will be apparent to those skilled in the art to which the invention pertains that other variations and modifications of the embodiments herein may be made without departing from the spirt and scope of the invention.

What is claimed is:

1. A vacuum cleaner cord rewinder device for storing and dispensing a flexible cord, comprising:

a base adapted to be mounted on a vacuum cleaner;

a reel having an axis of rotation oriented vertically such that said reel rotates in a horizontal plane, said reel being rotatably connected to the base and operative to rotate about said axis of rotation in a first direction for winding the flexible cord about the reel for storage within the cord rewinder device and in a second direction opposite the first direction for dispensing the flexible cord from the cord rewinder device;

a spring element connected to and between the base and the reel and operative to apply a winding force to the reel;

a brake mechanism mounted to the base and operative to move to and between a reel engaged position whereby the brake mechanism contacts the reel preventing rotation of the reel in the first direction while permitting rotation of the reel in the second direction and a reel disengaged position;

a brake release arm for disengaging the brake mechanism from contact with the reel to permit the reel to automatically rotate in the first direction as a result of the winding force of the spring element.

2. A cord rewinder device according to claim 1, wherein the base is generally cylindrically shaped and configured with an interior sized to at least partially receive the reel.

3. A cord rewinder device according to claim 2, wherein the base includes a non-rotatable stubshaft disposed centrally about the axis of rotation within the interior of the base and projecting axially therefrom.

4. A cord rewinder device according to claim 3, wherein the reel includes a central disk member having an opening disposed centrally therethrough with the disk member extending radially within the interior and terminating in an outer periphery, an annular wall extending axially relative to the disk member and connected circumferentially about the outer periphery and a pair of flanges connected to the annular wall, extending radially therefrom and spaced apart from one another to form an annular cord receiving channel.

5. A cord rewinder device according to claim 4, further comprising a bearing disposed about the stubshaft and contacting the disk member of the reel, the bearing mounting the reel to the stubshaft for relative rotation with respect to the stubshaft.

6. A cord rewinder device according to claim 4, wherein the annular wall has an inner circumferential surface, the inner circumferential surface and the disk member defining at least one cylindrical chamber extending axially into the reel.

7. A cord rewinder device according to claim 6, wherein the annular wall has a cord receiving opening extending therethrough and sized for receiving an end portion of the cord.

8. A cord rewinder device according to claim 7, further comprising a cord connector plate sized to be received within the cylindrical chamber and fixedly connected to the reel for rotation therewith, the cord connector plate adapted to retain and anchor the end portion of the cord extending through the cord receiving opening.

9. A cord rewinder device for storing and dispensing a flexible cord, comprising:

a base being generally cylindrically shaped and configured with an interior sized to at least partially receive the reel, the base including a non-rotatable stubshaft disposed centrally about the axis of rotation within the interior of the base and projecting axially therefrom;

a reel rotatably connected to the base and operative to rotate about an axis of rotation in a first direction for winding the flexible cord about the reel for storage within the cord rewinder device and in a second direction opposite the first direction for dispensing the flexible cord from the cord rewinder device, the reel including a central disk member having an opening disposed centrally therethrough with the disk member extending radially within the interior and terminating in an outer periphery, an annular wall extending axially relative to the disk member and connected circumferentially about the outer periphery and a pair of flanges connected to the annular wall, extending radially therefrom and spaced apart from one another to form an annular cord receiving channel, the annular wall having an inner circumferential surface, the inner circumferential surface and the disk member defining at least one cylindrical chamber extending axially into the reel, the annular wall having a cord receiving opening extending therethrough and sized for receiving an end portion of the cord;

a spring element connected to and between the base and the reel and operative to apply a winding force to the reel;

a brake mechanism mounted to the base and operative to move to and between a reel engaged position whereby the brake mechanism contacts the reel preventing rotation of the reel in the first direction while permitting rotation of the reel in the second direction and a reel disengaged position;

a brake release arm for disengaging the brake mechanism from contact with the reel to permit the reel to automatically rotate in the first direction as a result of the winding force of the spring element; and a cord connector plate sized to be received within the cylindrical chamber and fixedly connected to the reel for rotation therewith, the cord connector plate adapted to retain and anchor the end portion of the cord extending through the cord receiving opening, the cord connector plate including a plurality of arcuate shaped walls arranged juxtaposed to and spaced apart from one another to form at least one cord receiving channel such that the end portion of the cord is disposed within the at least one cord receiving channel in a gripping relationship to assist in retaining the end portion within the cord rewinder device.

10. A cord rewinder device for storing and dispensing a flexible cord, comprising:

a base being generally cylindrically shaped and configured with an interior sized to at least partially receive the reel, the base including a non-rotatable stubshaft disposed centrally about the axis of rotation within the interior of the base and projecting axially therefrom;

a reel rotatably connected to the base and operative to rotate about an axis of rotation in a first direction for winding the flexible cord about the reel for storage within the cord rewinder device and in a second direction opposite the first direction for dispensing the flexible cord from the cord rewinder device, the reel including a central disk member having an opening disposed centrally therethrough with the disk member extending radially within the interior and terminating in an outer periphery, an annular wall extending axially relative to the disk member and connected circumferentially about the outer periphery and a pair of flanges connected to the annular wall, extending radially therefrom and spaced apart from one another to form an annular cord receiving channel, the annular wall having an inner circumferential surface, the inner circumferential surface and the disk member defining at least one cylindrical chamber extending axially into the reel;

a spring element connected to and between the base and the reel and operative to apply a winding force to the reel;

a brake mechanism mounted to the base and operative to move to and between a reel engaged position whereby the brake mechanism contacts the reel preventing rotation of the reel in the first direction while permitting rotation of the reel in the second direction and a reel disengaged position, the brake mechanism including a brake arm pivotably connected to the base for contacting the inner circumferential surface of the annular wall; and a brake release arm for disengaging the brake mechanism from contact with the reel to permit the reel to automatically rotate in the first direction as a result of the winding force of the spring element.

11. A cord rewinder device according to claim 10, wherein the brake arm is resiliently biased in contact with the inner circumferential surface of the annular wall.

12. A cord rewinder device according to claim 10, wherein the brake arm includes a brake pad sized and adapted to contact the inner circumferential surface of the annular wall when the brake mechanism is in the reel engaged position.

13. A cord rewinder device according to claim 12, wherein the brake pad is fabricated from a resilient material.

14. A cord rewinder device according to claim 12, wherein, when the brake mechanism is in the reel engaged position and the reel begins rotation in the first direction, the brake arm pivots in the first direction and the brake pad wedges against the inner circumferential surface of the annular wall thereby applying a braking force on the reel.

15. A cord rewinder device according to claim 14, wherein further rotation of the reel in the first direction increases the braking force on the reel.

16. A cord rewinder device according to claim 14, wherein, when the brake mechanism is in the reel engaged position and the reel rotates in the second direction, the brake arm pivots in the brake pad away from the inner circumferential surface of the annular wall thereby reducing the braking force on the reel.

17. A cord rewinder device according to claim 12, wherein the brake mechanism includes a brake release arm pivotably connected to the base and operative to pivot the brake arm in a direction to disengage the brake pad from contact with the inner circumferential surface of the annular wall thereby moving the brake mechanism from the reel engaged position to the reel disengaged position.

18. A cord rewinder device for storing and dispensing a flexible cord, comprising:

a base being generally cylindrically shaped and configured with an interior sized to at least partially receive the reel, the base including a non-rotatable stubshaft disposed centrally about the axis of rotation within the interior of the base and projecting axially therefrom;

a reel rotatably connected to the base and operative to rotate about an axis of rotation in a first direction for winding the flexible cord about the reel for storage within the cord rewinder device and in a second direction opposite the first direction for dispensing the flexible cord from the cord rewinder device, the reel including a central disk member having an opening disposed centrally therethrough with the disk member extending radially within the interior and terminating in an outer periphery, an annular wall extending axially relative to the disk member and connected circumferentially about the outer periphery and a pair of flanges connected to the annular wall, extending radially therefrom and spaced apart from one another to form an annular cord receiving channel, the annular wall having an inner circumferential surface, the inner circumferential surface and the disk member defining at least one cylindrical chamber extending axially into the reel;

a spring element connected to and between the base and the reel and operative to apply a winding force to the reel, the spring element being a spiral spring having a first end portion connected to the stubshaft and a second end portion connected to the reel;

a brake mechanism mounted to the base and operative to move to and between a reel engaged position whereby the brake mechanism contacts the reel preventing rotation of the reel in the first direction while permitting rotation of the reel in the second direction and a reel disengaged position; and a brake release arm for disengaging the brake mechanism from contact with the reel to permit the reel to automatically rotate in the first direction as a result of the winding force of the spring element.

19. A cord rewinder device according to claim 18, wherein the stubshaft includes an axially extending slot sized to receive and retain the first end portion of the spiral spring and wherein the reel includes a fastener structure comprising a lug and a pair of slots on the inner circular wall of the reel with the lug positioned between the slots to form a serpentine channel, the second end portion of the spiral spring configured to be received in the serpentine channel to retain and anchor the second end portion of the spiral spring to the reel.

20. A cord rewinder device for storing and dispensing a flexible cord, comprising:

a base;

a reel rotatably connected to the base and operative to rotate about an axis of rotation in a first direction for winding the flexible cord about the reel for storage within the cord rewinder device and in a second direction opposite the first direction for dispensing the flexible cord from the cord rewinder device;

a spring element connected to and between the base and the reel and operative to apply a winding force to the reel;

a brake mechanism mounted to the base and operative to move to and between a reel engaged position whereby the brake mechanism contacts the reel preventing rotation of the reel in the first direction while permitting rotation of the reel in the second direction and a reel disengaged position;

a brake release arm for disengaging the brake mechanism from contact with the reel to permit the reel to automatically rotate in the first direction as a result of the winding force of the spring element; and a cover sized and adapted for releasable connection to the base thereby enclosing the reel and spring element therein.

21. A cord rewinder device according to claim 20, further comprising a conduit connected to at least one of the base and cover, the conduit forming a passage into the cord rewinder device for the cord to enter into and be dispensed from the cord rewinder device.

22. A cord rewinder device for storing and dispensing an electrical cord having a pair of electrical leads, the cord rewinder device comprising:

a generally cylindrically-shaped housing having a base and a cover releasably connected to each other and forming an interior in the housing, the base having a stubshaft disposed centrally about an axis of rotation within the interior and projecting axially from the base, the cover having a pair of electrical brush elements extending into the interior of the housing;

a reel rotatably connected to the stubshaft within the interior of the housing and operative to rotate relative to the stubshaft in a first direction for winding the electrical cord about the reel for storage within the cord rewinder device and in a second direction opposite the first direction for dispensing the electrical cord from the cord rewinder device;

a spring element connected to and between the base and the reel and operative to apply a winding force to the reel;

a cord connector plate connected to the reel for rotation therewith and having an inner electrically-conductive slip ring and an outer electrically-conductive slip ring disposed concentrically about the axis of rotation and arranged in a manner to maintain continuous electrical contact with a respective electrical brush element when the base and the cover are releasably connected together and the reel rotates, each ring having an electrically-conductive terminal member extending radially outwardly therefrom for connection with a respective lead of the electrical cord; and a brake mechanism mounted to the base and operative to move to and between a reel engaged position whereby the brake mechanism contacts the reel preventing rotation of the reel in the first direction while permitting rotation of the reel in the second direction and a reel disengaged position whereby the brake mechanism is disengaged from contact with the reel to permit the reel to automatically rotate in the first direction as a result of the winding force.

23. A cord rewinder device according to claim 22, wherein the reel includes a central disk member having an opening disposed centrally therethrough with the disk member extending radially within the interior and terminating in an outer periphery, an annular wall extending axially relative to the disk member and connected circumferentially about the outer periphery and a pair of flanges connected to the annular wall, extending radially therefrom and spaced apart from one another to form an annular cord receiving channel, the annular wall having an inner circumferential surface, the inner circumferential surface and the disk member defining a pair of opposing cylindrical chambers extending axially into the reel.

24. A cord rewinder device according to claim 23, further comprising a bearing disposed about the stubshaft and contacting the disk member of the reel, the bearing mounting the reel to the stubshaft for relative rotation with respect to the stubshaft.

25. A cord rewinder device according to claim 23, wherein the annular wall has a cord receiving opening extending therethrough and sized for receiving an end portion of the cord.

26. A cord rewinder device according to claim 25, wherein the cord connector plate is sized to be received within a selected one of the cylindrical chambers and is fixedly connected to the reel, the cord connector plate adapted to retain the end portion of the electrical cord within the cord rewinder device after the cord receiving opening receives the end portion of the electrical cord.

27. A cord rewinder device according to claim 23, wherein the spring element is a spiral spring having a first end portion connected to the stubshaft and a second end portion connected to an inner circular wall of the reel, the stubshaft including an axially extending slot sized to receive and retain the first end portion of the spiral spring, the reel including a fastener structure comprising a lug and a pair of slots on the inner circular wall of the reel with the lug positioned between the slots to form a serpentine channel, the second end portion of the spiral spring configured to be received in the serpentine channel to retain and anchor the second end portion of the spiral spring to the reel.

28. A cord rewinder device according to claim 22, further comprising a conduit connected to at least one of the base and cover, the conduit forming a passage into the cord rewinder device for the electrical cord to enter into and be dispensed from the cord rewinder device.

29. A cord rewinder device for storing and dispensing an electrical cord having a pair of electrical leads, the cord rewinder device comprising:

a generally cylindrically-shaped housing having a base and a cover releasably connected to each other and forming an interior in the housing, the base having a stubshaft disposed centrally about an axis of rotation within the interior and projecting axially from the base, the cover having a pair of electrical brush elements extending into the interior of the housing;

a reel rotatably connected to the stubshaft within the interior of the housing and operative to rotate relative to the stubshaft in a first direction for winding the electrical cord about the reel for storage within the cord rewinder device and in a second direction opposite the first direction for dispensing the electrical cord from the cord rewinder device, the reel including a central disk member having an opening disposed centrally therethrough with the disk member extending radially within the interior and terminating in an outer periphery, an annular wall extending axially relative to the disk member and connected circumferentially about the outer periphery and a pair of flanges connected to the annular wall, extending radially therefrom and spaced apart from one another to form an annular cord receiving channel, the annular wall having an inner circumferential surface, the inner circumferential surface and the disk member defining a pair of opposing cylindrical chambers extending axially into the reel, the annular wall having a cord receiving opening extending therethrough and sized for receiving an end portion of the cord;

a spring element connected to and between the base and the reel and operative to apply a winding force to the reel;

a cord connector plate connected to the reel for rotation therewith and having an inner electrically-conductive slip ring and an outer electrically-conductive slip ring disposed concentrically about the axis of rotation and arranged in a manner to maintain continuous electrical contact with a respective electrical brush element when the base and the cover are releasably connected together and the reel rotates, each ring having an electrically-conductive terminal member extending radially outwardly therefrom for connection with a respective lead of the electrical cord, the cord connector plate being sized to be received within a selected one of the cylindrical chambers and being fixedly connected to the reel, the cord connector plate being adapted to retain the end portion of the electrical cord within the cord rewinder device after the cord receiving opening receives the end portion of the electrical cord, the cord connector plate including three arcuate shaped walls arranged consecutively and radially outwardly from the axis of rotation, the three arcuate walls being spaced apart from one another to form a pair of cord receiving channels such that the end portion of the cord is disposed within the pair of cord receiving channels in a looping fashion to assist in retaining and anchoring the end portion within the cord rewinder device; and a brake mechanism mounted to the base and operative to move to and between a reel engaged position whereby the brake mechanism contacts the reel preventing rotation of the reel in the first direction while permitting rotation of the reel in the second direction and a reel disengaged position whereby the brake mechanism is disengaged from contact with the reel to permit the reel to automatically rotate in the first direction as a result of the winding force.

30. A cord rewinder device for storing and dispensing an electrical cord having a pair of electrical leads, the cord rewinder device comprising:

a generally cylindrically-shaped housing having a base and a cover releasably connected to each other and forming an interior in the housing, the base having a stubshaft disposed centrally about an axis of rotation within the interior and projecting axially from the base, the cover having a pair of electrical brush elements extending into the interior of the housing;

a reel rotatably connected to the stubshaft within the interior of the housing and operative to rotate relative to the stubshaft in a first direction for winding the electrical cord about the reel for storage within the cord rewinder device and in a second direction opposite the first direction for dispensing the electrical cord from the cord rewinder device, the reel including a central disk member having an opening disposed centrally therethrough with the disk member extending radially within the interior and terminating in an outer periphery, an annular wall extending axially relative to the disk member and connected circumferentially about the outer periphery and a pair of flanges connected to the annular wall, extending radially therefrom and spaced apart from one another to form an annular cord receiving channel; the annular wall having an inner circumferential surface, the inner circumferential surface and the disk member defining a pair of opposing cylindrical chambers extending axially into the reel;

a spring element connected to and between the base and the reel and operative to apply a winding force to the reel;

a cord connector plate connected to the reel for rotation therewith and having an inner electrically-conductive slip ring and an outer electrically-conductive slip ring disposed concentrically about the axis of rotation and arranged in a manner to maintain continuous electrical contact with a respective electrical brush element when the base and the cover are releasably connected together and the reel rotates, each ring having an electrically-conductive terminal member extending radially outwardly therefrom for connection with a respective lead of the electrical cord;

a brake mechanism mounted to the base and operative to move to and between a reel engaged position whereby the brake mechanism contacts the reel preventing rotation of the reel in the first direction while permitting rotation of the reel in the second direction and a reel disengaged position whereby the brake mechanism is disengaged from contact with the reel to permit the reel to automatically rotate in the first direction as a result of the winding force, the brake mechanism including a brake arm pivotably connected to the housing for contacting the inner circumferential surface of the annular wall in a resiliently biased manner.

31. A cord rewinder device according to claim 30, wherein the brake arm includes a brake pad fabricated from a resilient material and sized and adapted to contact the inner circumferential surface of the annular wall when the brake mechanism is in the reel engaged position wherein, when the brake mechanism is in the reel engaged position and the reel begins to rotate in the first direction, the brake arm pivots in the first direction and wedges against the inner circumferential surface of the annular wall thereby applying a braking force on the reel and, when the brake mechanism is in the reel engaged position and the reel rotates in the second direction, the brake arm pivots in the second direction and the brake pad moves away from the inner circumferential surface of the annular wall thereby reducing the braking force on the reel.

32. A cord rewinder device according to claim 31, wherein further rotation of the reel in the first direction increases the braking force on the reel.

33. A cord rewinder device according to claim 31, wherein the brake mechanism includes a brake release arm pivotably connected to the housing and operative to pivot the brake arm in a direction to disengage the brake pad from contact with the inner circumferential surface of the annular wall thereby moving the brake mechanism from the reel engaged position to the reel disengaged position.

34. A cord rewinder device for storing and dispensing an electrical cord of a vacuum cleaner, the vacuum cleaner having a body defining an interior space and an electrical motor having an electrical cable with a pair of electrical cable leads disposed in the interior space, the electrical cord having a pair of electrical leads, the cord rewinder device comprising:

a housing having a base and a cover releasably connected to each other, the base having a stubshaft disposed centrally about an axis of rotation and projecting axially from the base, a pair of electrical brush elements extending through the housing with exterior ends of the electrical brush elements connected to respective electrical cable leads of the electrical motor and interior ends of the electrical brush elements projecting into the housing, the base having a plurality of fasteners operative to secure the housing within the interior space of the body in a horizontal orientation;

a reel rotatably mounted to the stubshaft within the interior of the housing and operative to rotate in a first direction for winding the electrical cord about the reel for storage within the cord rewinder device and in a second direction opposite the first direction for dispensing the electrical cord from the cord rewinder device;

a spring element connected to and between the base and the reel and operative to apply a winding force to the reel; and a cord connector plate connected to the reel for rotation therewith and having an inner electrically-conductive slip ring and an outer electrically-conductive slip ring disposed concentrically about the axis of rotation and arranged in a manner to maintain continuous electrical contact with a respective electrical brush element when the base and the cover are releasably connected together and the reel rotates, each ring having an electrically-conductive terminal member extending radially outwardly therefrom for connection with a respective lead of the electrical cord.

35. A cord rewinder device according to claim 34, wherein the reel includes a central disk member having an opening disposed centrally therethrough, the disk member extending radially within the interior and terminating in an outer periphery, an annular wall extending axially relative to the disk member and connected circumferentially about the outer periphery and a pair of flanges connected to the annular wall, extending radially outwardly therefrom and spaced apart from one another to form an annular cord receiving channel, the annular wall having an inner circumferential surface, the inner circumferential surface and the disk member defining a pair of opposing cylindrical chambers extending axially into the reel.

36. A cord rewinder device according to claim 35, wherein the spring element is a spiral spring having a first end portion connected to the stubshaft and a second end portion connected to an inner circular wall of the reel, the stubshaft including an axially extending slot sized to receive and retain the first end portion of the spiral spring, the reel including a fastener structure comprising a lug and a pair of slots on the inner circular wall of the reel with the lug positioned between the slots to form a serpentine channel, the second end portion of the spiral spring configured to be received in the serpentine channel to retain and anchor the second end portion of the spiral spring to the reel.

37. A cord rewinder device according to claim 35, further comprising a bearing disposed about the stubshaft and contacting the disk member of the reel, the bearing mounting the reel to the stubshaft for relative rotation with respect to the stubshaft.

38. A cord rewinder device according to claim 35, wherein the annular wall has a cord receiving opening extending therethrough and sized for receiving an end portion of the electrical cord, the cord connector plate sized to be received within a selected one of the cylindrical chambers, fixedly connected to the reel and adapted to retain the end portion of the electrical cord within the cord rewinder device after the cord receiving opening receives the end portion of the electrical cord.

39. A cord rewinder device for storing and dispensing an electrical cord of a vacuum cleaner, the vacuum cleaner having a body defining an interior space and an electrical motor having an electrical cable with a pair of electrical cable leads disposed in the interior space, the electrical cord having a pair of electrical leads, the cord rewinder device comprising:

a housing having a base and a cover releasably connected to each other, the base having a stubshaft disposed centrally about an axis of rotation and projecting axially from the base, a pair of electrical brush elements extending through the housing with exterior ends of the electrical brush elements connected to respective electrical cable leads of the electrical motor and interior ends of the electrical brush elements projecting into the housing, the base having a plurality of fasteners operative to secure the housing within the interior space of the body in a horizontal orientation;

a reel rotatably mounted to the stubshaft within the interior of the housing and operative to rotate in a first direction for winding the electrical cord about the reel for storage within the cord rewinder device and in a second direction opposite the first direction for dispensing the electrical cord from the cord rewinder device, the reel including a central disk member having an opening disposed centrally therethrough, the disk member extending radially within the interior and terminating in an outer periphery, an annular wall extending axially relative to the disk member and connected circumferentially about the outer periphery and a pair of flanges connected to the annular wall, extending radially outwardly therefrom and spaced apart from one another to form an annular cord receiving channel, the annular wall having an inner circumferential surface, the inner circumferential surface and the disk member defining a pair of opposing cylindrical chambers extending axially into the reel, the annular wall having a cord receiving opening extending therethrough and sized for receiving an end portion of the electrical cord, the cord connector plate sized to be received within a selected one of the cylindrical chambers, fixedly connected to the reel and adapted to retain the end portion of the electrical cord within the cord rewinder device after the cord receiving opening receives the end portion of the electrical cord;

a spring element connected to and between the base and the reel and operative to apply a winding force to the reel;

a cord connector plate connected to the reel for rotation therewith and having an inner electrically-conductive slip ring and an outer electrically-conductive slip ring disposed concentrically about the axis of rotation and arranged in a manner to maintain continuous electrical contact with a respective electrical brush element when the base and the cover are releasably connected together and the reel rotates, each ring having an electrically-conductive terminal member extending radially outwardly therefrom for connection with a respective lead of the electrical cord, the cord connector plate including three arcuate shaped walls arranged consecutively, radially outwardly from the axis of rotation and projecting axially from the cord connector plate, the three arcuate walls spaced apart from one another to form a pair of cord receiving channels such that the end portion of the electrical cord is disposed within the pair of cord receiving channels in a looping fashion to assist in retaining and anchoring the end portion of the electrical cord within the cord rewinder device.

40. A cord rewinder device according to claim 34, further comprising a conduit connected to at least one of the base and cover, the conduit forming a passage into the cord rewinder device for the electrical cord to enter into and be dispensed from the cord rewinder device.

41. A cord rewinder device for storing and dispensing an electrical cord of a vacuum cleaner, the vacuum cleaner having a body defining an interior space and an electrical motor having an electrical cable with a pair of electrical cable leads disposed in the interior space, the electrical cord having a pair of electrical leads, the cord rewinder device comprising:

a housing having a base and a cover releasably connected to each other, the base having a stubshaft disposed centrally about an axis of rotation and projecting axially from the base, a pair of electrical brush elements extending through the housing with exterior ends of the electrical brush elements connected to respective electrical cable leads of the electrical motor and interior ends of the electrical brush elements projecting into the housing, the base having a plurality of fasteners operative to secure the housing within the interior space of the body in a horizontal orientation;

a reel rotatably mounted to the stubshaft within the interior of the housing and operative to rotate in a first direction for winding the electrical cord about the reel for storage within the cord rewinder device and in a second direction opposite the first direction for dispensing the electrical cord from the cord rewinder device, the reel including a central disk member having an opening disposed centrally therethrough, the disk member extending radially within the interior and terminating in an outer periphery, an annular wall extending axially relative to the disk member and connected circumferentially about the outer periphery and a pair of flanges connected to the annular wall, extending radially outwardly therefrom and spaced apart from one another to form an annular cord receiving channel, the annular wall having an inner circumferential surface, the inner circumferential surface and the disk member defining a pair of opposing cylindrical chambers extending axially into the reel;

a spring element connected to and between the base and the reel and operative to apply a winding force to the reel; and a cord connector plate connected to the reel for rotation therewith and having an inner electrically-conductive slip ring and an outer electrically-conductive slip ring disposed concentrically about the axis of rotation and arranged in a manner to maintain continuous electrical contact with a respective electrical brush element when the base and the cover are releasably connected together and the reel rotates, each ring having an electrically-conductive terminal member extending radially outwardly therefrom for connection with a respective lead of the electrical cord; and a brake mechanism mounted to the base and operative to move to and between a reel engaged position whereby the brake mechanism contacts the reel preventing rotation of the reel in the first direction while permitting rotation of the reel in the second direction and a reel disengaged position whereby the brake mechanism is disengaged from contact with the reel to permit the reel to automatically rotate in the first direction as a result of the winding force, the brake mechanism including a brake arm pivotably connected to the housing for contacting the inner circumferential surface of the annular wall in a resiliently biased manner.

42. A cord rewinder device according to claim 41, wherein the brake arm includes a brake pad fabricated from a resilient material and sized and adapted to contact the inner circumferential surface of the annular wall when the brake mechanism is in the reel engaged position and wherein, when the brake mechanism is in the reel engaged position and the reel begins to rotate in the first direction, the brake arm pivots in the first direction and wedges against the inner circumferential surface of the annular wall thereby applying a braking force on the reel and, when the brake mechanism is in the reel engaged position and the reel rotates in the second direction, the brake arm pivots in the second direction and the brake pad moves away from the inner circumferential surface of the annular wall thereby reducing the braking force on the reel.

43. A cord rewinder device according to claim 42, wherein the brake mechanism includes a brake release arm pivotably connected to the housing and operative to disengage the brake arm from contact with the inner circumferential surface of the annular wall thereby moving the brake mechanism from the reel engaged position to the reel disengaged position.

44. An electrical cord rewinder device for storing and dispensing a flexible cord, comprising:

a base;

a reel rotatably connected to the base and operative to rotate about an axis of rotation in a first direction for winding the flexible cord about the reel for storage within the cord rewinder device and in a second direction opposite the first direction for dispensing the flexible cord from the cord rewinder device;

a spring element connected to and between the base and the reel and operative to apply a winding force to the reel;

a brake mechanism mounted to the base and operative to move to and between a reel engaged position whereby the brake mechanism contacts the reel preventing rotation of the reel in the first direction while permitting rotation of the reel in the second direction and a reel disengaged position;

a brake release arm for disengaging the brake mechanism from contact with the reel to permit the reel to automatically rotate in the first direction as a result of the winding force of the spring element; and an inner and outer electrically conductive slip ring that provide electrical power from a power cable to a motor, wherein the terminal ends of the slip rings are in different planes from one another.

* * * * *